UNITED STATES PATENT OFFICE.

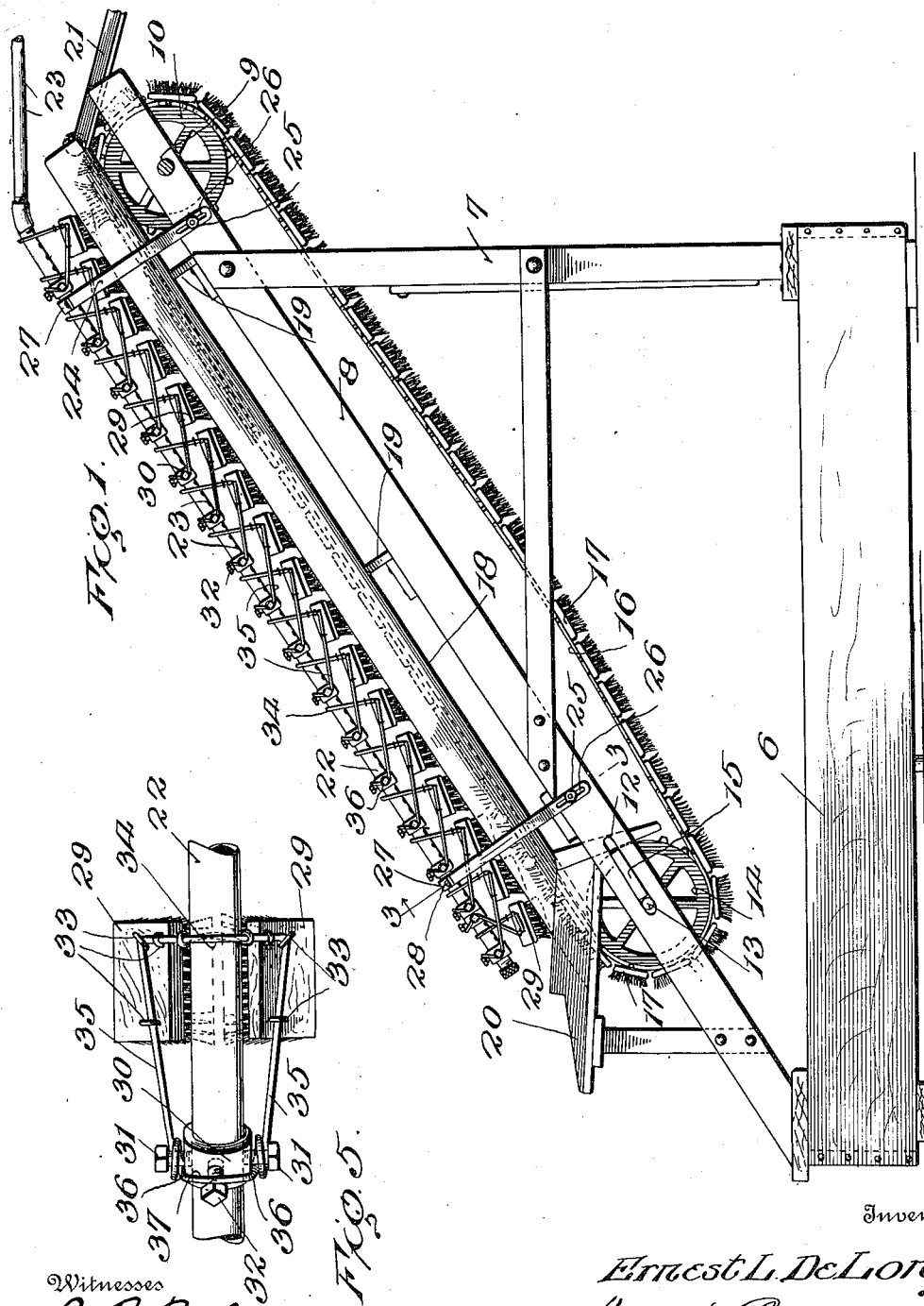

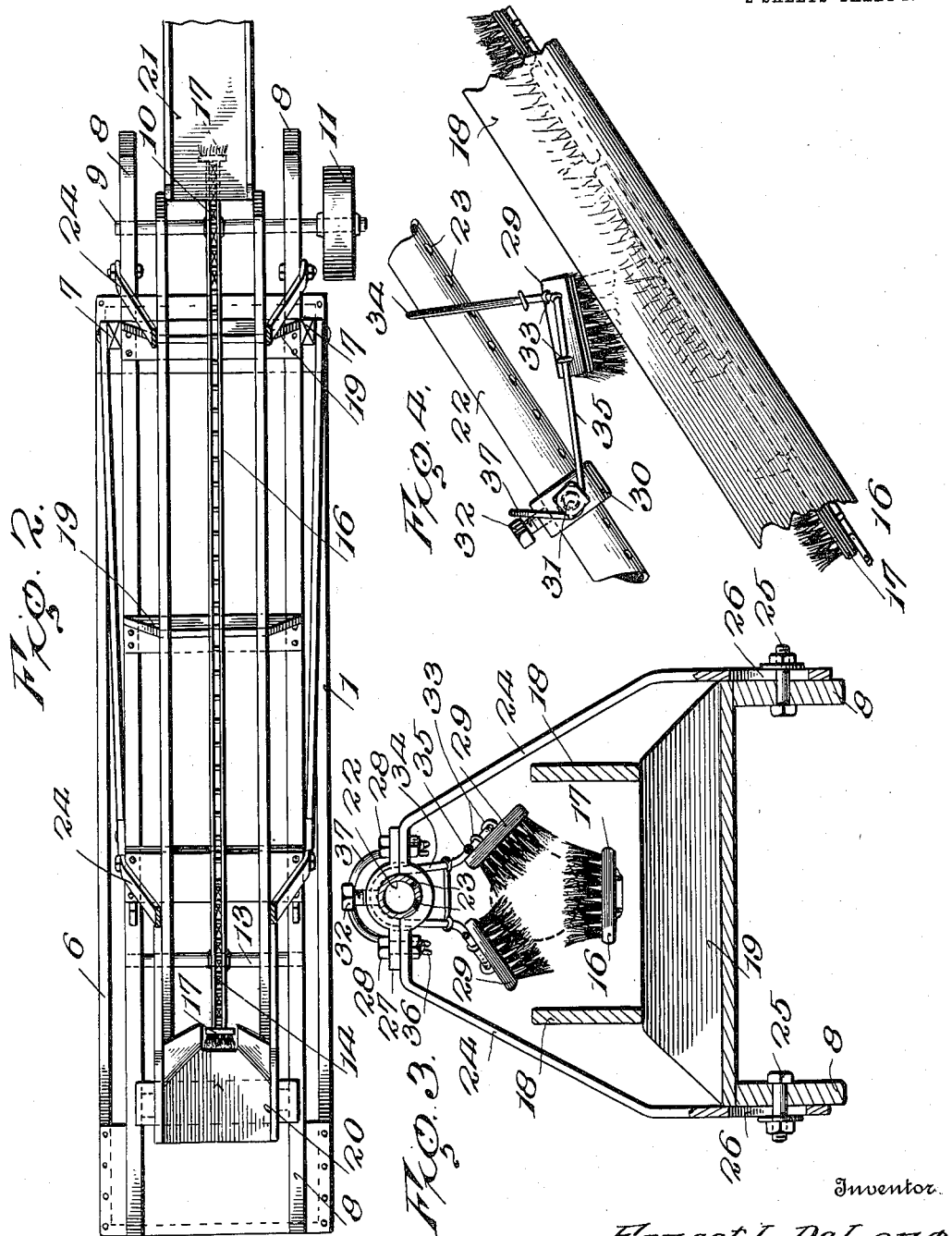

ERNEST L. DE LONG, OF CLEARWATER, FLORIDA.

MACHINE FOR WASHING FRUIT.

983,691.

Specification of Letters Patent. Patented Feb. 7, 1911.

Application filed March 9, 1910. Serial No. 548,141.

*To all whom it may concern:*

Be it known that I, ERNEST L. DE LONG, a citizen of the United States, residing at Clearwater, in the county of Hillsboro and State of Florida, have invented certain new and useful Improvements in Machines for Washing Fruit, of which the following is a specification.

My invention relates to certain new and useful improvements in machines for washing and cleaning fruit, and particularly oranges or lemons, and the object of my invention is to produce a device of this character which will quickly, rapidly and thoroughly clean the fruit and remove therefrom all dirt, smut and fungi without in any way breaking the skin or otherwise injuring the fruit, so that the fruit will have an attractive appearance and also to prevent its decay.

With these and other objects in view my invention consists in certain constructions, combinations and arrangements of parts, the preferred form of which will be first described in connection with the accompanying drawings and then the invention particularly pointed out in the appended claims.

Referring to the drawings wherein the same part is designated by the same reference numeral wherever is occurs, Figure 1 is a side elevation of a fruit washing machine embodying my invention; Fig. 2 is a top plan view showing however the upper sets of brushes and the water supply pipe removed and the pipe supporting brackets in section; Fig. 3 is a section taken on line 3, 3 of Fig. 1 looking in the direction of the arrow; Fig. 4 is a detailed perspective view of a portion of the supply pipe and lower brushes, showing in detail the spring mechanism for mounting the upper stationary brushes; Fig. 5 is a top plan view of the construction shown in Fig. 4.

6 is a frame or box which, in the form of invention shown, forms the base of my machine. Rising from one end of this base are a pair of uprights 7 which, in the form of invention shown, support one end of a pair of inclined side bars 8 which, at their other end, are supported by the opposite end of the trough from that supported by the uprights 7. With this form of construction a combined fruit washer and elevator is provided. If, however, it is not desired to elevate the fruit as they are washed, then the side supporting bars 8 would not be inclined but would be supported in horizontal position a suitable height above the base 6.

9 is a shaft journaled in the side bars 8 adjacent one end thereof and carrying a sprocket wheel 10 and a driving pulley 11, the sprocket wheel being located intermediate the side bars. Adjacent the other end of the side bars I preferably provide a pair of elongated slots 12, in which is mounted a shaft 13 carrying a sprocket wheel 14 intermediate the side bars. For the purpose of enabling the sprocket wheel 14 to be adjusted toward and away from the sprocket 10 and as a means for effecting this adjustment I have shown a block 15 inserted in the slot. One of these blocks is inserted in each slot and by varying the width of these blocks the distance between the sprocket wheels may be varied.

16 is a sprocket chain running around the sprocket wheels 10 and 14 and carrying brushes 17 secured to the sprocket chain in any known or desired manner which will enable the sprocket chain to run around the wheels. The upper run of the sprocket chains and brushes passes between a pair of side guides 18 which extend along each side of the upper run of the chain and are supported by a series of supports 19 from the side bars 8.

20 is a feed trough which is supported at the lower end of the side bars 8 in position to feed the fruit to be washed on to the brushes at the lower end of the upper run of the belt. Preferably, and as shown, this feed box or trough is slightly inclined toward the belt or brushes so as to cause the fruit to be more readily picked up by the brushes.

21 is a chute carried by the upper ends of the side bars 8 in position to receive the fruit at the end of the upper run of the chain as they are delivered from the belt.

22 indicates a pipe which extends over the upper run of the chain and brushes and, preferably and as shown, also extends over the delivery chute 21. This pipe is provided on its under side with a series of small perforations 23 through which water to wash the fruit is delivered on to the entire run of the brushes and also upon the delivery trough, whereby the fruit to be washed is continuously supplied with fresh water from the time it leaves the feed hopper 20 until it passes out of the chute 21, and the same water is never used twice. This pipe is shown as supported by a pair of bars 24 which are shown as U-shaped in form and extend down on the sides of the side bars 8 where they are adjustably held in position by means of the bolts 25 passing through elongated slots 26 in the lower ends of the bars.

In order to secure the pipe to the supports 24 I have shown the upper portion of the supports as being provided with a depression, and 27 is a trap secured to the support by means of the bolts 28. Carried by the pipe 22 are a series of pairs of brushes 29 depending therefrom and each pair forming an inverted V extending over the upper run of the brushes 17, carried by the sprocket chain 16, whereby a triangular channel is formed through which the fruit to be washed is carried. As best shown in Fig. 3, the backs of the brushes of each pair are separated, in order to provide an opening which is in line with the openings 23 in the pipe 22 and through which the water may pass on to the fruit.
Preferably, and as shown, the upper set of brushes are yieldingly mounted to prevent injury to the fruit while being washed, and at the same time to thoroughly wash fruit of varying size. As a means for so yieldingly mounting the brushes I have shown the pipe as being provided with a series of collars 30 which are provided on diametrically opposite sides with projecting bolts or heads 31, and on their upper portion with a screw 32 which passes through the collar, engages the pipe and so locks each collar in position.

As a means of yieldingly mounting the pairs of brushes 29 I secure to each pair of brushes, by means of staples 33, an endless spring wire which, between the brushes, is bent upwardly to form a yoke 34 extending over the pipe between the brushes. From the fastening means this wire extends in a pair of arms 35, and at the rear end of each of these arms a coil 36 is formed which extends around the lugs 31, and between these coils a yoke 37 is formed which is in front of the set screw 32 of the collar 30.

As best shown in Fig. 1, it will be seen that each of the yokes 34 extends between the arms 35 of the supporting pair of brushes, so that each pair of brushes is spring pressed toward the traveling brushes 17 and each pair can yield independently of all the others. This is true of all the sets of brushes except those nearest the feed trough 20, in which case the arms 35 are bent so as to cross the yoke 34, and the collar 30 is ahead of this yoke, as clearly shown in Fig. 1.

From the foregoing description of the preferred form of my construction it will be seen that as the fruit to be washed is thrown onto the feed trough 20 it will be caught by the upper run of the traveling brushes 17, which will cause it to pass between the successive pairs of brushes 29 which are in the form of an inverted V. The fruit will thus be brushed on three sides and will be constantly rotated by the onward movement of the brushes 17. From the time it is engaged by the moving brushes it will be moreover subjected to a constant water supply from the perforations in the pipe 22. As therefore each fruit passes along through the machine it will be subjected to this brushing action and to a fresh supply of water, and the same water is not used twice. After the fruit has passed the brushes it passes on to the delivery hopper 21, where it is still subjected to the action of the water by reason of the extension of the pipe 22 over such delivery trough or hopper. The fruit will consequently be thoroughly cleaned in the operation and be delivered free from all dirt, smut, fungi or other foreign matter. Because the upper brushes are yieldingly mounted in the manner shown the cleaning operation will be effected without injury to the skin of the fruit and at the same time fruit varying in size will all be subjected to a thorough cleaning action during its passage through the machine.

In the form of invention shown the washing machine will also operate as an elevator and may be used to carry the fruit from one floor to another of the building in which the packing operation progresses. It is to be of course understood that where it is not desired to have the machine act as an elevator, it may be arranged horizontally without interfering with its efficiency as a washing machine.

Having thus described my invention what I claim as new and desire to secure by Letters Patent is:

1. In a machine for washing fruit, the combination of an endless chain of traveling brushes, a perforated water pipe extending above it and longitudinally thereof, and a series of brushes mounted upon said pipe for coöperation with the traveling brushes.

2. In a machine for washing fruit, the combination of an endless chain of traveling brushes, a perforated water pipe extending above it and longitudinally thereof, and a series of brushes spring mounted in pairs upon said pipe for coöperation with the traveling brushes.

3. In a machine for washing fruit, the combination of an endless chain of traveling brushes, a perforated water pipe extending above it and longitudinally thereof, and a series of brushes arranged in the form of an inverted V mounted upon said pipe for cooperation with the traveling brushes.

4. In a machine for washing fruit, the combination of an endless chain of traveling brushes, a perforated water pipe extending above it and longitudinally thereof, a series of collars adjustably mounted upon said pipe and provided with lateral projections, springs mounted on said collars by means of said projections, and brushes carried by said springs for coöperation with the traveling brushes.

5. In a machine for washing fruit, the combination of an endless chain of traveling brushes, a perforated water pipe extending above it and longitudinally thereof, mounts for said pipe adjustably attached to the frame of the machine, two sets of brushes spring-mounted upon said pipe and arranged in rows at either side thereof and at an angle to one another whereby a triangular channel for the fruit is formed longitudinally of the three sets of brushes.

6. In a machine for washing fruit, the combination with an endless brush-carrying chain, of a water supplying pipe located above the upper run of said chain, said pipe being provided with a plurality of openings in its under side to supply water onto the brushes of the chain, and a series of brushes yieldingly mounted on said pipe, said series of brushes being arranged in pairs, each pair forming an inverted V with the pipe above the apex of the V.

In testimony whereof I affix my signature in presence of two witnesses.

ERNEST L. DE LONG.

Witnesses:
GEO. W. CHURCH,
SEWARD F. CHURCH.